INVENTORS
WALTER S. STRAUSS
GEORGE A. SHEDLARSKI

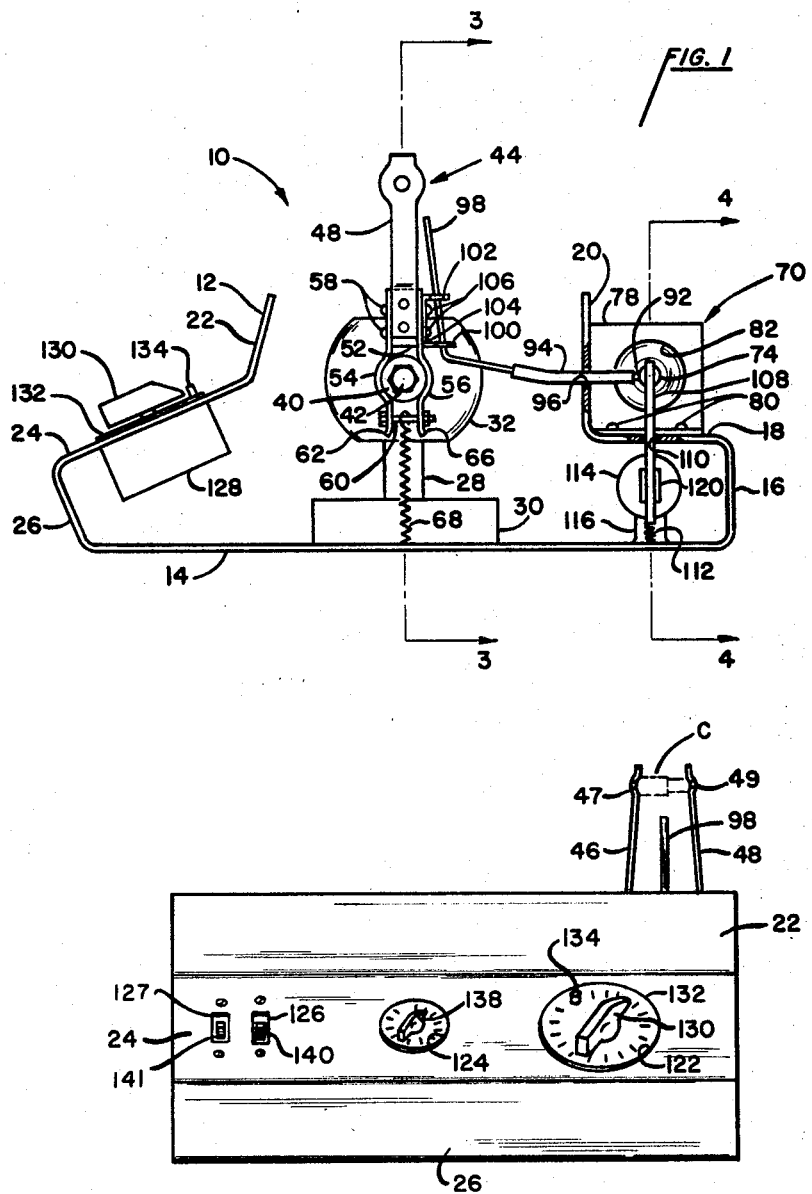
Nov. 19, 1968 — W. S. STRAUSS ET AL — 3,411,755
MIXING APPARATUS FOR USE IN THE PREPARATION OF DENTAL CEMENT AND METHOD OF PREPARING THE SAME
Filed April 25, 1967 — 2 Sheets-Sheet 1
INVENTORS
WALTER S. STRAUSS
GEORGE A. SHEDLARSKI
BY
ATTORNEY

BY *Allen J. Jaffe*

ATTORNEY

United States Patent Office 3,411,755
Patented Nov. 19, 1968

3,411,755
MIXING APPARATUS FOR USE IN THE PREPARATION OF DENTAL CEMENT AND METHOD OF PREPARING THE SAME
Walter S. Strauss and George A. Shedlarski, Buffalo, N.Y., assignors to Dentek, Inc., Buffalo, N.Y., a corporation of New York
Filed Apr. 25, 1967, Ser. No. 633,598
15 Claims. (Cl. 259—72)

ABSTRACT OF THE DISCLOSURE

A method of and an apparatus for preparing certain dental materials suc has zinc phosphate and silicate cements wherein the liquid constituent is added to a capsule containing the powder constituent, the capsule is oscillated to promote the mixing of the constituents and cooled to free the heat generated by the physical and/or chemical reaction of the constituents and thereby prevent premature hardening of the cement.

Background of the invention

The present invention relates to the preparation of dental materials and, more particularly, to the preparation of various dental cements. As used herein dental cements include those materials that are employed primarily as restorative filling material either alone or in conjunction with another material, or to retain restorations or appliances in a fixed position within the mouth.

Heretofore, the only successful methods of preparing the popular dental cements, such as the zinc phosphates and the silicates, involved the employment of manual spatulation techniques; according to which a liquid and powder constituent are mixed by a spatula until a consistency is obtained that is judged to be proper by the visual perception of the operator. The final consistency may be satisfactory or not depending upon the skill and experience of the operator. In addition to the initial powder to liquid ratio the consistency of the cement depends upon such other variables as time, temperature and manner of manipulation. It is therefore not enough to utilize a previously established powder to liquid ratio if the other variables are not suitably controlled. According to existing spatulaiton techniques such predetermined ratios function as guides only; the actual final consistency being dependent upon the skill and judgment of the operator.

Aside from the foregoing difficulties encountered in obtaining correct cement consistencies, the existing manual techniques are time consuming and tedious tasks. For example, the manual preparation of one commonly used cement, zinc phosphate, requires the following procedure:

(1) Place 1$\frac{9}{10}$ grams of powder (zinc oxide) accurately weighed on a slab;

(2) Form the powder into a flat rectangular shape with the spatula;

(3) Divide the powder into quarters, then into eighths and divide four of the eighths in half such that there are twelve portions;

(4) Place ½ cubic centimeter of liquid (phosphoric acid) on the slab;

(5) Spatulate $\frac{1}{16}$ of the powder into the liquid for thirty seconds;

(6) Add a second $\frac{1}{16}$ of the powder and spatulate fifteen seconds; and (7) Successively add the remaining portions of the powder, first sixteenths and finally the eighths, spatulating all but the last portion for ten seconds, spatulate the last portion for fifteen seconds, completing the mix in two and one half minutes.

It is thought to be readily apparent that the above procedure, as well as others presently practiced, in addition to being time consuming and laborious does little in the way of alleviating the anxiety of a dental patient awaiting the completion of such tasks.

Moreover, with the conventional techniques for preparing the dental cements the risks of contaminating the liquid constituent is greatly increased. Since the mixing of the cement takes place in an environment that is freely exposed to the atmosphere, the water content of the liquid constituent will be reduced in a dry atmosphere or increased in a humid atmosphere. A loss of water can cause crystallization of the liquid, whereas an increase in water content will cause the cement to set in much shorter times.

Although motor actuated mechanical mixers, called amalgamators, have been used for some time to prepare dental amalgams, attempts to employ such mixers for the dental cements have resulted in failure. With such amalgamators the final cements have been unworkable due to premature setting or else they have been inadequately mixed.

Summary of the invention

The foregoing disadvantages and difficulties of prior techniques for preparing dental cements are overcome according to the method and apparatus of the present invention, which teaches how such cements can be prepared automatically to proper consistencies without reliance on the visual perception and skill of the operator.

The present invention according to one of its aspects provides a motor driven mixer the speed of which is variable so that speeds considerably higher than prior devices are obtainable. It has been found that such higher speeds are necessary to promote thorough mixing of the cements. The constituents of the cement are placed in a capsule which is vibrated moving in a generally figure-eight shaped path, whereby the molecules of the constituent ingredients are caused to make many more collisions than would be the case if the capsule were reciprocated back and forth. This mode of vibration or oscillation in conjunction with the higher operating speeds results in an optimum mix. In addition means is provided to supply a coolant to the capsule before and/or during the agitation cycle. Cooling of the capsule is necessary to permit the heat generated by the chemical and/or physical reactions taking place therein to be liberated; without such cooling the addition of heat to the contents of the capsule causes premature hardening of the cement rendering it unworkable and therefore unusable.

The apparatus of the present invention is characterized by: support means for removably holding a capsule adapted to contain the constituents of a dental cement; motor means for oscillating the support means to promote the mixing of the constituents; and supply means for delivering a coolant material adjacent the vicinity of said support means that is adapted to be occupied by the capsule.

According to the present invention the method of preparing dental cements of the type having a liquid constituent and a powdered constituent is characterized by the steps of: adding a predetermined measured quantity of the liquid constituent to a capsule containing a predetermined quantity of the powdered constituent; oscillating the capsule to thoroughly mix the liquid and powdered constituents therein; and cooling the capsule and the contents thereof.

Brief description of the drawings

For a more fuller understanding of the present invention reference should now be made to the following detailed description of the same taken in conjunction with the accompanying drawings wherein;

FIGURE 1 is a side elevational view of the mixing apparatus according to the present invention;

FIGURE 2 is a front elevational view of the apparatus shown in FIGURE 1;

*Description of the preferred embodiment*

Figure 3:
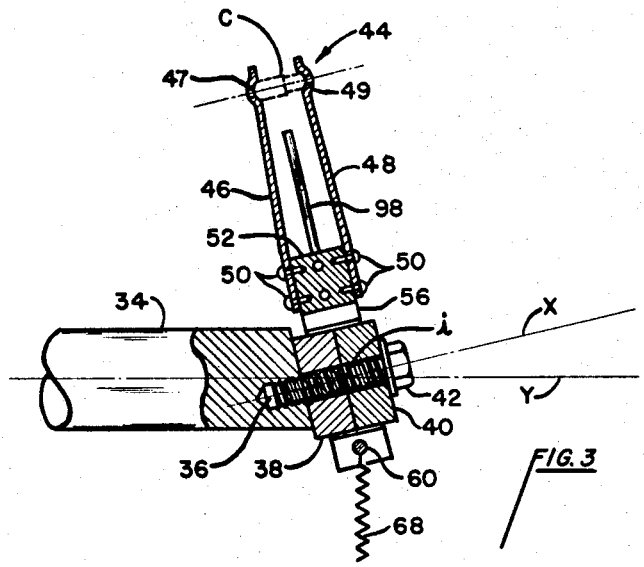
FIGURE 3 is a sectional view taken along line 3—3 of FIGURE 1.

Referring now to the drawings and, more particularly, to FIGURE 1, the improved mixing apparatus generally depicted at 10 includes a housing 12 formed of sheet metal or other suitable material. Housing 12 is defined by a planar base 14; a flat rear wall 16 projecting perpendicularly therefrom; an elongated platform or ledge surface 18 generally parallel to base 14; an inwardly spaced rear wall 20 projecting upwardly from ledge 18; and a front wall defined by inclined sections 22, 24 and 26 joining base 14. The operating mechanism of the mixing apparatus to be described hereinbelow is enclosed and supported by housing 12, with base 14 thereof adapted to rest on a suitable supporting surface or, if desirable, a plurality of adjustable legs affixed thereto. Although not illustrated, an outer cover is adapted to be placed over housing 12 to conceal the interior thereof and enhance the overall appearance of the apparatus.

Mounted interiorly of housing 12 and affixed to base 14 by means of suitable support structure 28 and 30 is a variable speed motor 32. Any suitable variable speed motor may be employed as, for example, a universal AC-DC motor, the speed of which being controlled by a rheostat or the like. As shown more clearly in FIGURE 3 motor 32 drives a rotatably mounted output shaft 34; the end of which that is remote from the motor containing a blind bore 36. The central axis $x$ of bore 36 makes a small angle with respect to the central axis $y$ of the shaft 34 as depicted greatly exaggerated in FIGURE 3, for a purpose to become apparent hereinbelow. A pair of annular bearings 38 and 40 are securely fixed to rotate with shaft 34 by means of bolt 42 threadingly received by bore 36. For a purpose to be discussed infra, it is important to note that the plane of contact between the bearings 38 and 40 passes through the intersection $i$ of axes $x$ and $y$.

Referring again to FIGURES 1 and 3 a capsule holder subassembly, indicated generally at 44, is shown as comprising a pair of oppositely facing elongated spring fingers 46 and 48; a block 52; and a pair of opposed clamps 54 and 56. The lower ends of fingers 46 and 48 are fastened to block 52 by bolts 50 or the like, whereas the generally convex upper ends 47 and 49 of which are adapted frictionally to engage and support complimentary convex ends of capsule $c$. The capsule $c$ is adapted to contain the constituent ingredients of a dental cement, and has a length that is slightly greater than the normal spacing of the ends 47 and 49 such that these ends are urged apart when the capsule is placed into operating position in the holder.

The clamps 54 and 56 comprise generally C-shaped members having upper extensions that are suitably affixed to block 52 as shown at 58 (FIGURE 1), and lower extensions 62 and 66 that are bolted together by bolt 60 passing through openings therein. Bearings 38 and 40 pass through, support and rotate within the central C-shaped sections of the clamps 54 and 56. A tension spring 68 fixed to bolt 60 and attached to base 14 functions to resiliently urge holder assembly normally to a vertical position and limits the lateral movement thereof. It will be apparent that rotation of shaft 34 about axis $y$ causes the bearings 38 and 40 affixed thereto to rotate also about axis $y$; but since the axis of symmetry of the bearings, as shown at $x$, is inclined with respect to the rotational axis $y$, holder assembly 44 will be caused to oscillate following a figure-eight shaped path. Also, since the plane of contact between the bearings crosses the intersection $i$ of the axes $x$ and $y$, the path taken by the holder assembly will be symmetrical about such intersection.

Figure 4:
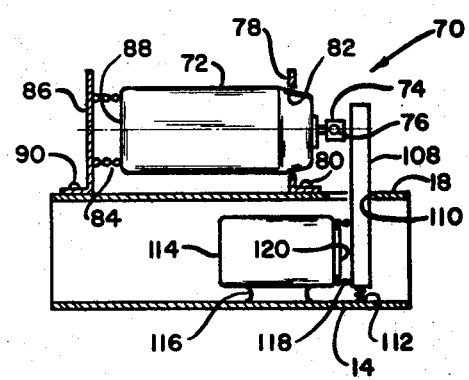
FIGURE 4 is a sectional view taken along line 4—4 of FIGURE 1.

Means to supply a coolant fluid to the vicinity of holder 44 that is adapted to contain the capsule $c$ is illustrated at 70 in FIGURES 1 and 4. Coolant supply means 70 comprises a container or reservoir 72, a push button valve stem 74 and a lateral outlet passage 76 leading therefrom. Container 72 is horizontally mounted on ledge surface 18 by means of a support plate 78 bolted at 80 to the ledge and having a central opening 82 for engaging and supporting the forward peripheral surface of the container. Urging container 72 into engagement with plate 78 is a compression spring 84 located between spring abutment plate 86 and the base 88 of the container; plate 86 being suitably bolted to ledge 18 as shown at 90. The arrangement is such that full compression of the spring 84 will allow container 72 to be removed for replacement purposes. Any conventional push-button container for dispensing a pressurized non-toxic refrigerant such as Freon-12 may be employed for container 72.

Interconnecting outlet passage 76 of container 72 with one end of a resilient coupling 94 (FIGURE 1) is a short tube 92. The other end of coupling 94 receives therein the lower end of a delivery nozzle 98, which functions to direct the flow of the coolant fluid between the ends 47 and 49 of the holder fingers and about the periphery of the capsule $c$. To support the nozzle in position a bracket 104 is provided. The bracket is bolted to clamp 56 at 106 and has upper and lower apertured ends 102 and 104 through which passes the nozzle 98.

Push-button valve stem 74 is actuated by a vertically extending metallic lever 108 that passes through and is guided by a rectangular slot 110 in ledge 18; the slot being larger than the width of lever 108 to permit limited movement thereof toward and away from stem 74. A weak spring 112 may be provided to support the lower end of lever 108. Lever 108 functions as the movable armature of and is actuated by a solenoid 114 mounted adjacent thereto and below the coolant assembly 70; the solenoid being supported upon base 14 by any suitable means 116. A spring 118 may be provided to normally urge lever 108 in spaced relation to the electromagnetic element 120 of the solenoid.

As shown in FIGURE 2 the inclined face 24 of housing 12 conatins circular openings 122 and 124 and rectangular open slots 126 and 127. Mounted in opening 122 is a timer 128, which may comprise any suitable commercially available timing mechanism as for example, one that is operated by a spring wound timing motor. A setting knob 130 cooperates with calibrations on the face plate 132 to vary the cycle times. As is conventional, a switch 134 is provided to actuate the timer and to also actuate motor 32. The switch may be of the type that automatically opens at the compeltion of the timing cycle.

To adjust the speed of motor 32 a variable speed control 136 is mounted in opening 124, only the actuating knob 138 of which being shown in FIGURE 2. A conventional speed controlling rheostat would suffice for unit 136.

A switch 140 projects through slot 126 and, as will become apparent hereinbelow, functions to deactivate the operation of the cooling assembly 70. Projecting through slot 127 is a second switch 127 which functions to permit operation of the cooling assembly independent from the operation of motor 32.

Figure 5:
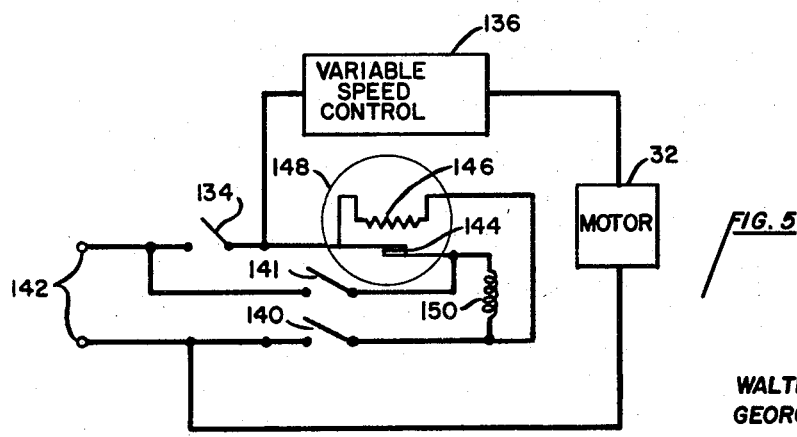
FIGURE 5 is a schematic wiring diagram illustrating the electrical connections between the various components shown in FIGURES 1–4.

The manner in which each of the operative components of the mixing apparatus according to the present invention is wired together is illustrated schematically in FIGURE 5. The motor actuating switch 134 is adapted to place motor 32 in electrical communication with voltage source terminals 142. Switch 134 is also adapted to place the source terminals in electrical communication with the thermostatic contacts 144 and the heating element 146 of a thermal delay relay 148 and the windings 150 of solenoid 114 when switch 140 is closed. The contacts 144 of the thermal delay relay 148 are normally closed and are adapted to open in response to the heat generated by element 146 after a definite time interval, say 4 to 5 seconds. A switch 141 corresponding to the one shown in FIGURE 2 is adapted to place the source terminals in electrical communication with the solenoid windings 150 when switch 140 is also closed to actuate the solenoid 114 independently of the motor 32.

In the ensuing description of the operation of the improved apparatus and method according to the present invention it will be assumed, by way of example and not limitation, that the dental cements to be prepared are, first, the silcates and then the zinc phosphates (sometimes called the zinc oxyphosphates).

A prepackaged plastic capsule may be supplied containing a measured amount of the powder constituent of the silicate cement, which might typically consist of fused $SiO_2$, $Al_2O_3$, $CaO$, metal phosphates, and metal fluorides. Just before use, to the capsule is added a measured amount o fthe liquid constituent, which usually consists of predominantly of a water solution of $H_3PO_4$. The powder to liquid ratio may correspond to that recommended by current manual mixing techniques, although experimentation has demonstrated that those ratios are no longer as critical as they were heretofore. The capsule is then mounted between the ends 47 and 49 of spring fingers 46 and 48; the timber knob 130 and the speed control knob 138 are set. With switch 140 closed and switch 141 open, switch 134 is depressed actuating motor 32 and solenoid windings 150. This causes the capsule to be oscillated following a symmetrical figure-eight shaped path and the lever 108 to be concurrently attracted to surface 120, depressing push-button valve stem 74 to initiate the spray of coolant fluid through nozzle 98 onto the peripherally surface of the capsule. After a predetermined time interval element 146 has generated sufficient heat to cause the thermostatic contacts 144 to separate; thereby opening the circuit to the solenoid windings 150 and stopping the coolant spray cycle. At a predetermined later time knob 130 of the timer is automatically returned to a zero setting, opening the switch 134 and stopping the oscillations of the capsule.

In order to adequately and thoroughly mix the constituents it has been found that substantial oscillation rates are required, such rates averaging about 4000 oscillations per minute or about 4000 revolutions per minute by motor shaft 34. At these speeds the reacting constituents within the capsule generate a substantial amount of heat, which, if not dissipated, would cause the cement to harden even before removal from the capsule thereby rendering it completely useless. However, with the cooling system of the present invention this heat is effectively dissipated and the resultant cement is of the proper consistency ready for application to the applicance and/or the patient. It has been determined that the outer surface of the capsule is cooled to about 32° F., and at the aforementioned speeds the spray cycle is about five seconds, whereas the oscillation period is about eight seconds. It is to be emphasized that these figures are given merely as illustrative in that variations are contemplated under different conditions or with different types of cement.

The chemical reaction occurring between the powder and liquid constituents of the zinc oxide cements is accompanied by a greater liberation of heat than with the silicates, therefore a slightly modified procedure is required. After the liquid is added to the powder and the capsule is mounted between the fingers 46 and 48, a precooling cycle of about five seconds is required. To this end, switch 141 is depressed, with switch 140 already closed, placing source terminals in communication with the solenoid windings 150 to thereby actuate the coolant spray independently of the motor 32 and the thermal delay relay 148.

After the precooling period, switch 141 is opened and switches 134 and 140 are closed causing oscillation and continued cooling of the capsule as outlined supra. The rate now would be about 4500 r.p.m. for only about one to two seconds. In order to ensure adequate dissipation of the heat, it has been found desirable to place the constituents of the zinc cements in a plastic lined aluminum capsule which effectively prevents the heat from the outside environment from being transferred to the interior of the precooled capsule.

Adding to the versatility of the presently described apparatus is the provision of switches 140 and 141 which when both are open enables the motor 32 to operate without any cooling cycles. Thus the present apparatus can be operated at higher or lower speeds to mix dental materials that do not require any cooling, as, for example the zinc oxide-eugenol cements and conventional amalgams. With regard to the latter it has been found that they can be effectively mixed according to the present invention without the use of a pestle in the capsule for agitation as is the current practice. The higher operating speeds combined with the symmetrical figure-eight shaped oscillation path according to the present apparatus makes the pestle unnecessary, thereby materially reducing the cost of the capsule.

While a preferred manner of achieving the advantages of the present invention has been illustrated and described, modifications thereof will occur to those skilled in the art. It is therefore intended that the invention is to be limited only by the scope of the appended claims.

We claim:
1. The method of preparing dental cement of the type composed of a liquid constituent and a powder constituent; comprising the steps of:
  (1) adding a measured quantity of the liquid constituent to a capsule containing a measured quantity of the powder constituent,
  (2) oscillating the capsule for a predetermined period at a rate of speed sufficient to thoroughly mix said constituents, and
  (3) cooling said capsule and the contents thereof to a temperature below that of the surrounding atmosphere.
2. The method according to claim 1, wherein:
  (4) the capsule is cooled during the predetermined oscillating period.
3. The method according to claim 2, wherein:
  (5) the powder constituent consists primarily of a silicate material.
4. The method according to claim 3, wherein:
  (6) said predetermined period is about eight seconds,
  (7) said rate of speed is about 4000 oscillations per minute, and
  (8) said step of cooling lasts for about five seconds.
5. The method according to claim 1, wherein:
  (4) the step of cooling the capsule is initiated before the oscillation step.
6. The method according to claim 5, wherein:
  (5) the powder constituent consists primarily of a zinc oxide material, and further comprising the step of:
  (6) placing said capsule into an outer aluminium container before the cooling step.
7. The method according to claim 6, wherein:
  (7) said predetermined period is about two seconds,
  (8) said rate of speed is about 4500 oscillations per minute, and
  (9) said step of cooling is initiated about five seconds before the oscillation step commences.
8. The method according to claim 1, wherein:
  (4) said capsule is oscillated along a generally figure-eight shaped path.
9. A mixing apparatus for preparing dental cement of the type composed of a liquid constituent and a powder constituent, comprising:

(1) holder means for removably holding a capsule adapted to contain said constituents,
(2) motor means for oscillating said holder means at a rate of speed sufficient to thoroughly mix said constituents, and
(3) passage means located adjacent said holder means for supplying a coolant fluid to the vicinity of said holder that is adapted to be occupied by said capsule.

10. The apparatus according to claim 9, further comprising:
(4) a coolant fluid reservoir having an outlet passage communicating with said passage means, and
(5) valve means located in said outlet passage.

11. The apparatus according to claim 10, further comprising:
(6) first timing means for actuating said motor means and initiating the opening of said valve means, and
(7) second timing means operative to cause said valve means to close a predetermined time after the actuation of said motor means.

12. The apparatus according to claim 11, further comprising:
(8) means operative to effect the actuation of said valve means independent upon the actuation of said motor means, and
(9) means operative to effect the actuation of said motor means independent upon the actuation of said valve means.

13. The apparatus according to claim 10, wherein said:
(6) holder means comprises a pair of elongated spring fingers having generally convex ends for holding said capsule.

14. The apparatus according to claim 9, wherein:
(4) said holder means comprises a pair of elongated spring fingers having generally convex ends for holding said capsule, and wherein there is further provided:
(5) means to adjustably vary said oscillation rate.

15. The apparatus according to claim 9, further comprising:
(4) means mounting said holder means for oscillation along a generally symmetrical figure-eight shaped path.

References Cited
UNITED STATES PATENTS

| | | | |
|---|---|---|---|
| 2,286,599 | 6/1942 | Chott | 259—72 X |
| 2,306,296 | 12/1942 | Chott | 259—91 |
| 2,879,042 | 3/1959 | Jones | 259—76 X |

ROBERT W. JENKINS, *Primary Examiner.*